United States Patent [19]

Braff et al.

[11] Patent Number: 5,166,930
[45] Date of Patent: Nov. 24, 1992

[54] DATA CHANNEL SCHEDULING DISCIPLINE ARRANGEMENT AND METHOD

[75] Inventors: Martin Braff, Aberdeen; David S. Einstein, Branchburg; Kerry W. Fendick, Middletown; Manoel A. Rodrigues, Red Bank, all of N.J.

[73] Assignee: AT&T Bell Laboratories, Murray Hill, N.J.

[21] Appl. No.: 629,282

[22] Filed: Dec. 17, 1990

[51] Int. Cl.$^5$ .............................................. H04J 3/24
[52] U.S. Cl. ..................................... 370/94.1; 370/60; 370/85.2
[58] Field of Search ................ 370/94.1, 60, 85.2, 370/85.15, 85.5

[56] References Cited

U.S. PATENT DOCUMENTS

| | | | |
|---|---|---|---|
| 4,644,533 | 2/1987 | Braff et al. | 370/94 |
| 4,899,334 | 2/1990 | Shimizu | 370/60 |
| 4,899,335 | 2/1990 | Johnson, Jr. et al. | 370/60 |
| 5,016,248 | 5/1991 | Kudoh | 370/94.1 |
| 5,021,947 | 6/1991 | Campbell et al. | 395/700 |

FOREIGN PATENT DOCUMENTS

| | | |
|---|---|---|
| 74737/87 | 1/1988 | Australia . |
| 323835 | 7/1989 | European Pat. Off. . |
| WO86/02510 | 4/1986 | PCT Int'l Appl. . |

Primary Examiner—Douglas W. Olms
Assistant Examiner—Shick Hom
Attorney, Agent, or Firm—John A. Caccuro

[57] ABSTRACT

This invention is a method of and apparatus for implementing a service scheduling discipline to enable data devices efficient access to data resources. According to the invention, information identifying one or more data packets of each data batch is sorted into one or more of a plurality (N) of epoch queues, such that for each data batch, no information identifying more than a predetermined number (P) of data packets from a particular channel is inputted into each epoch queue. Each epoch queue is then cyclically served exhaustively by outputting the identified data packets to the facility. Data that cannot be placed in the epoch queues is temporarily placed in an overflow queue. The overflow queue data is subsequently sorted into the epoch queues and transmitted.

29 Claims, 12 Drawing Sheets

DATA NETWORK

FIG. 4 FUNCTIONAL BLOCK DIAGRAM

TRUNKING ALGORITHM

TRANSMITTER

RECEIVER

OVERFLOW QUEUE SORTER

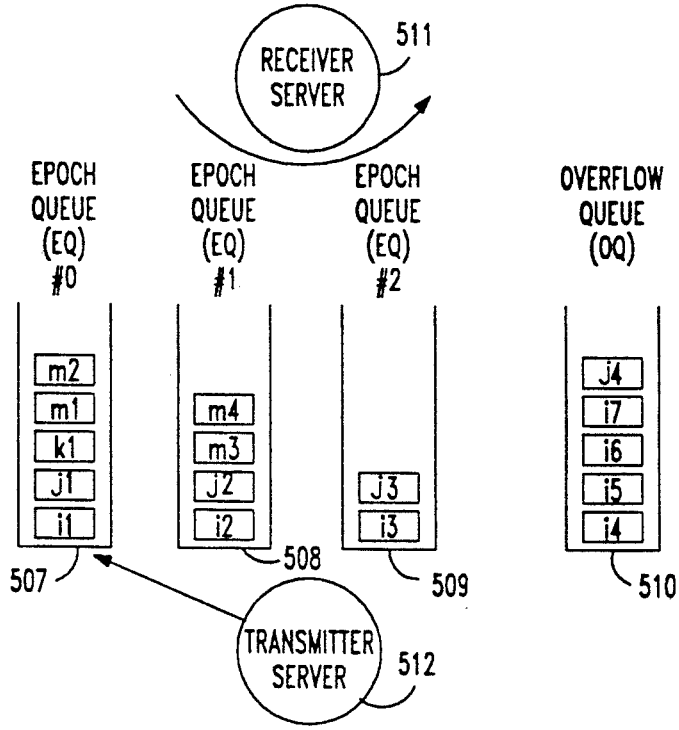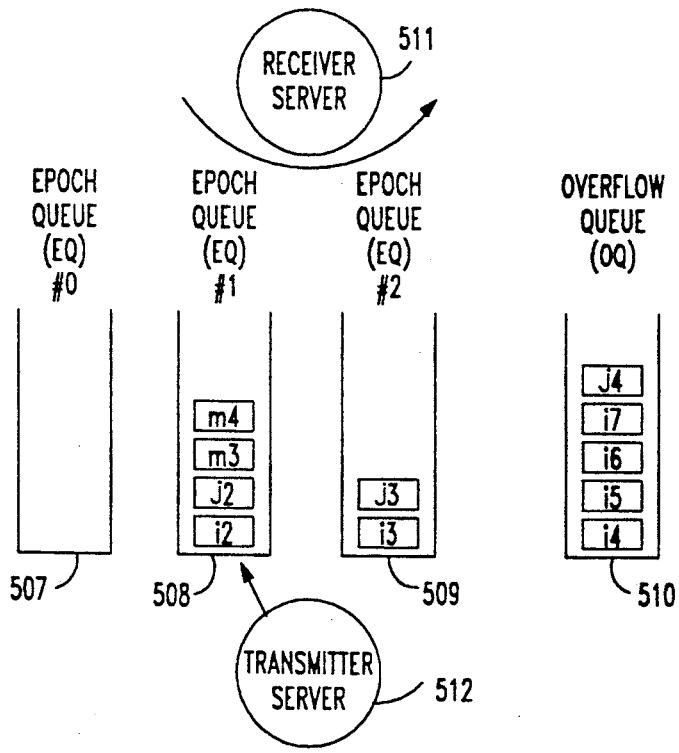

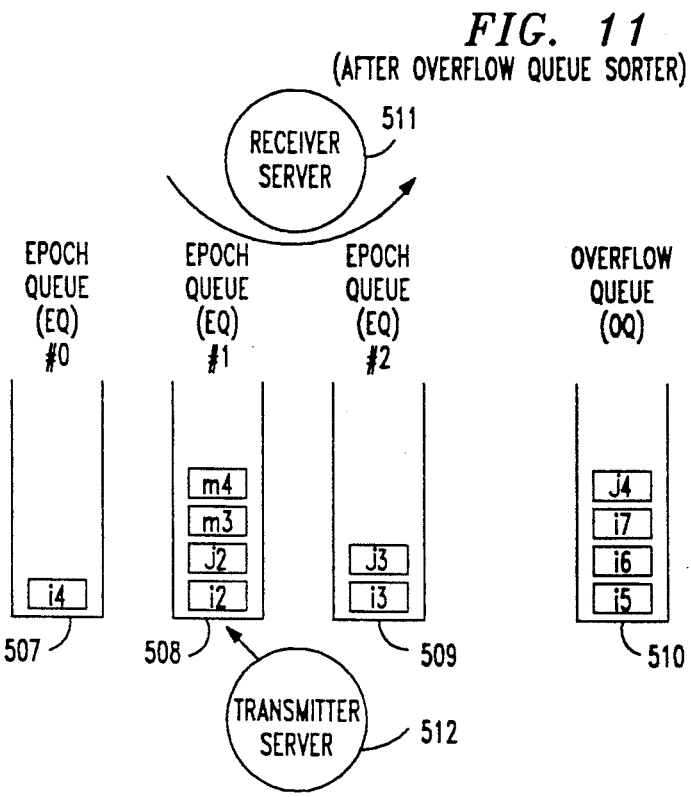
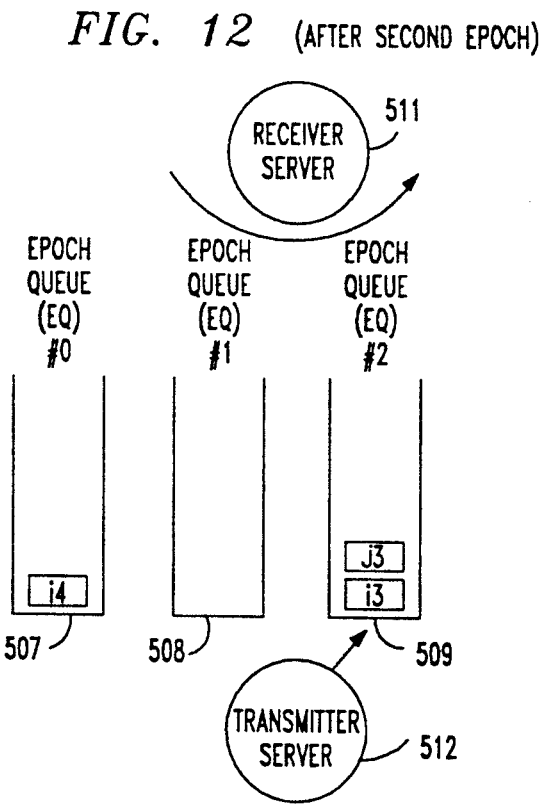

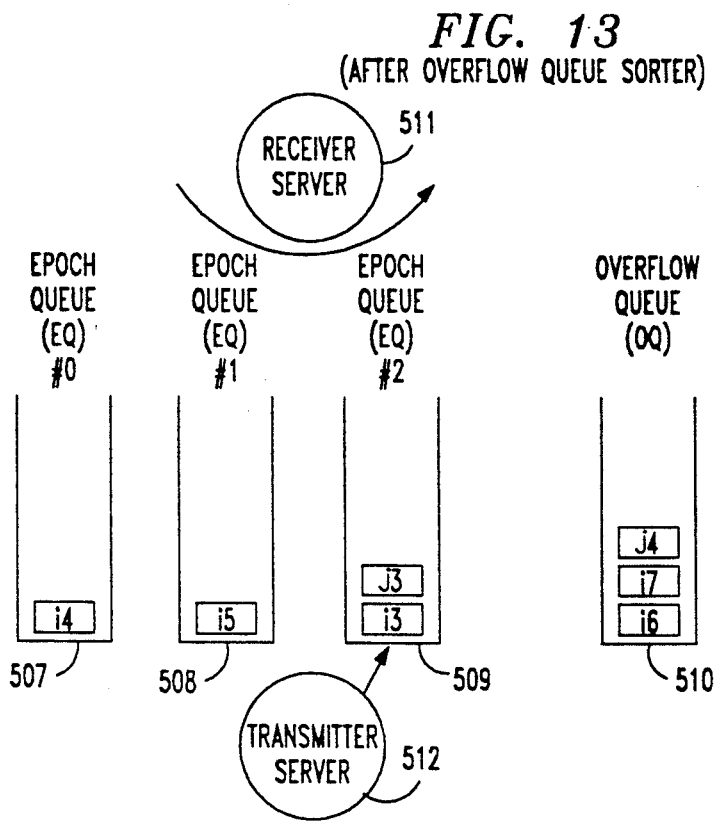
FIG. 13 (AFTER OVERFLOW QUEUE SORTER)
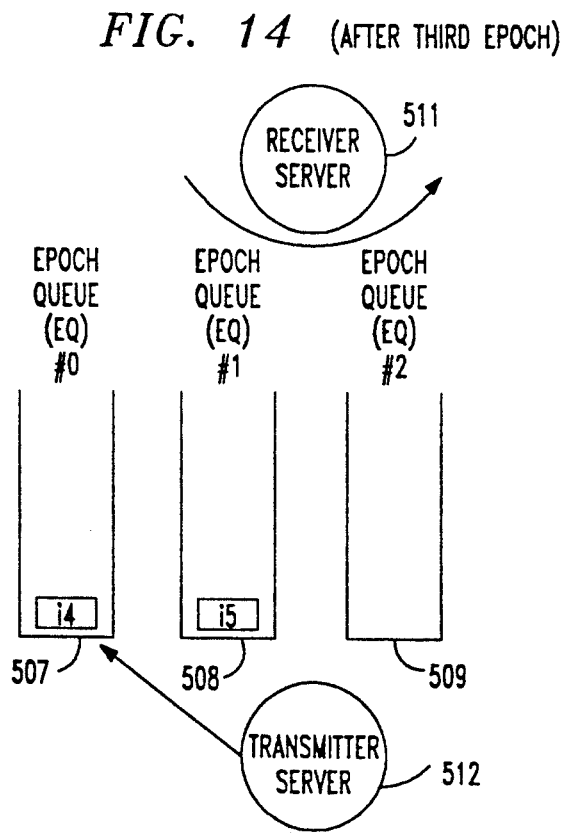
FIG. 14 (AFTER THIRD EPOCH)

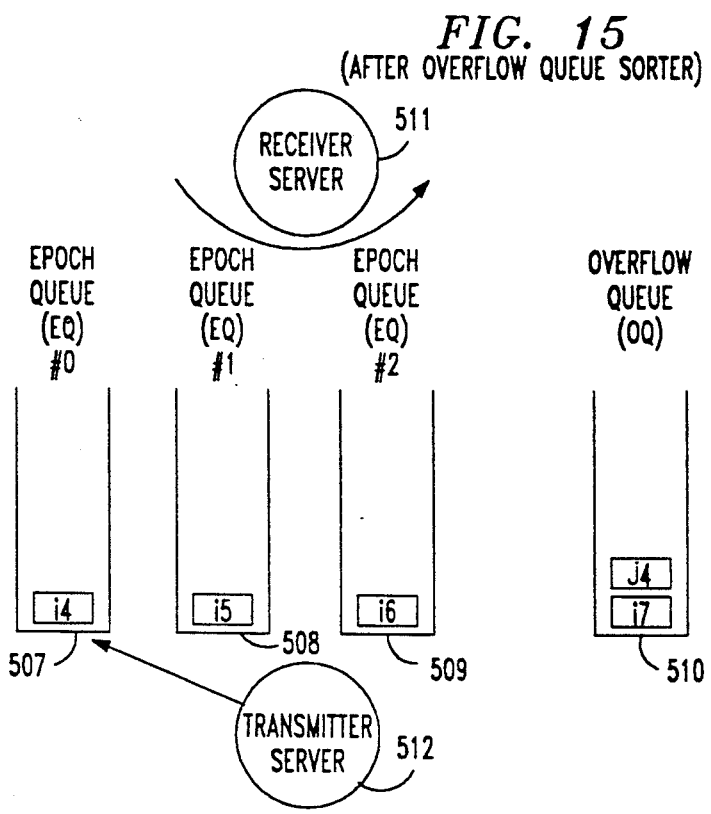

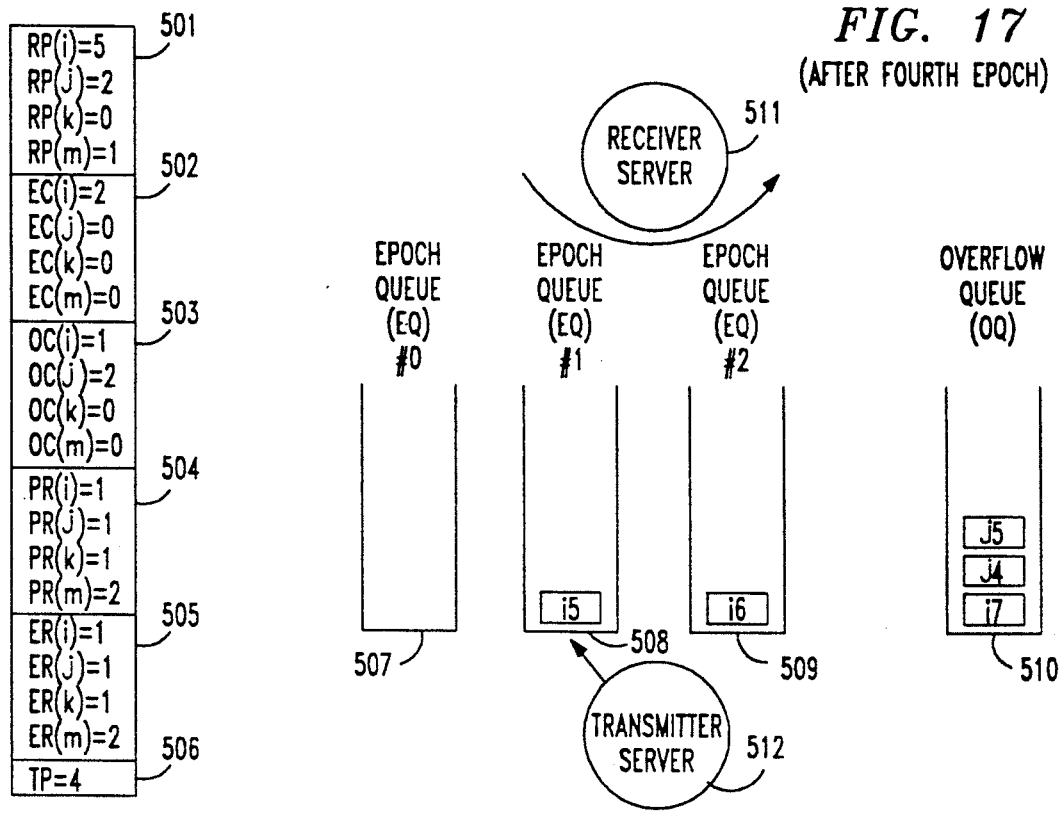
FIG. 17 (AFTER FOURTH EPOCH)
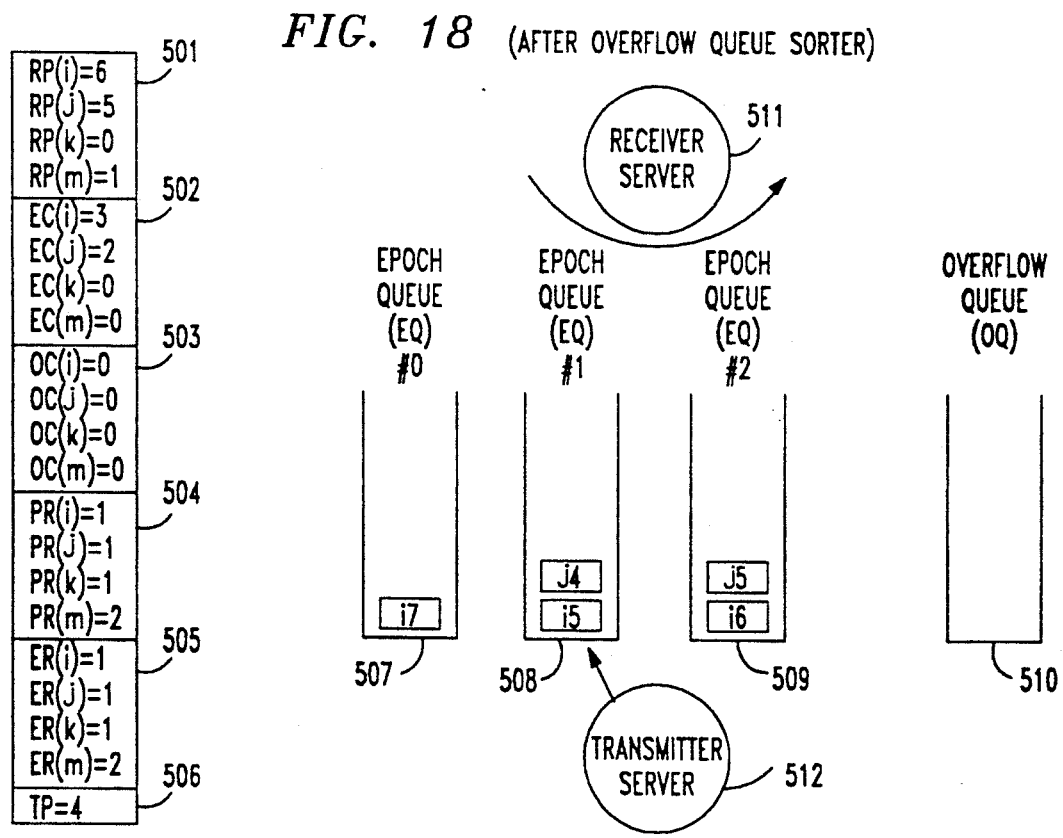
FIG. 18 (AFTER OVERFLOW QUEUE SORTER)

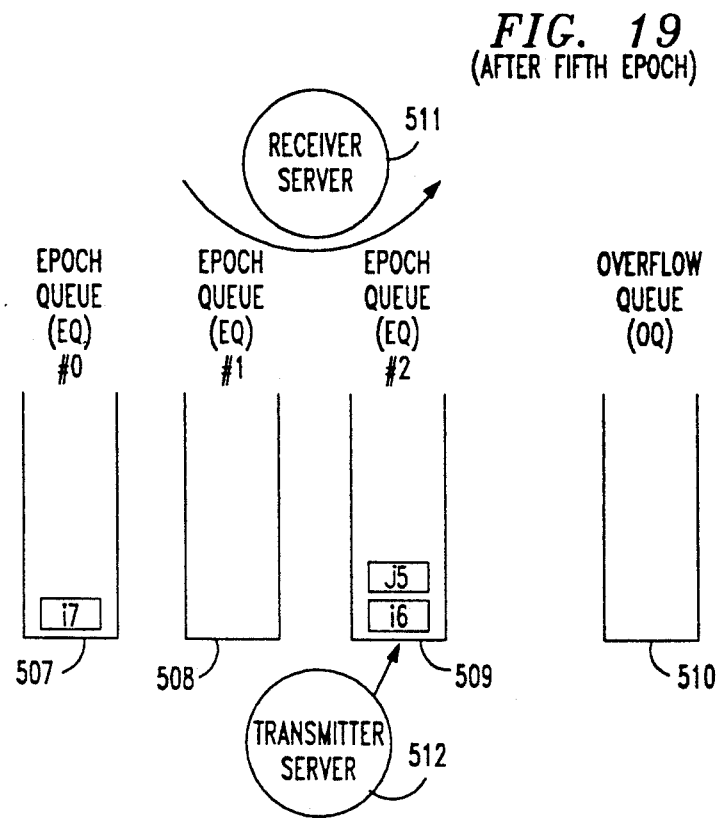
FIG. 19 (AFTER FIFTH EPOCH)
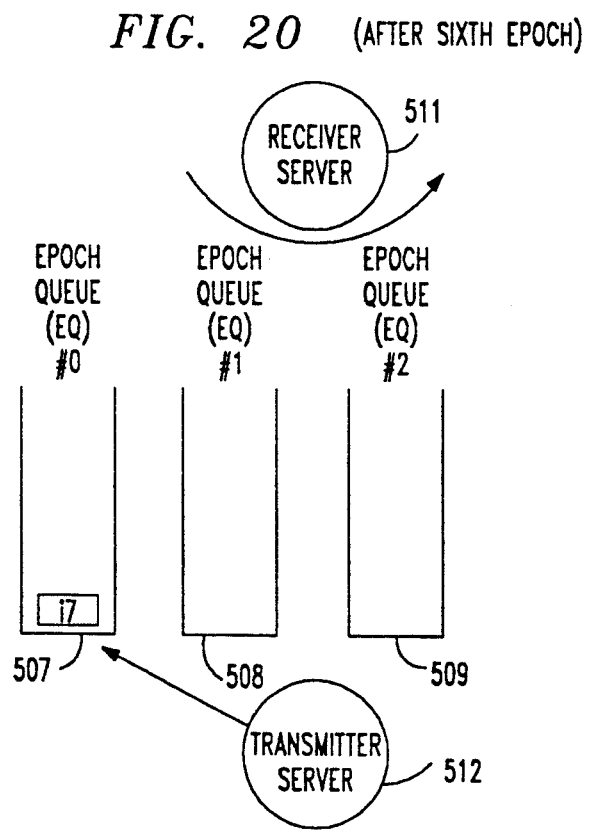
FIG. 20 (AFTER SIXTH EPOCH)

DATA CHANNEL SCHEDULING DISCIPLINE ARRANGEMENT AND METHOD

TECHNICAL FIELD

This invention relates to slotted packet data systems, and more particularly, to a scheduling discipline for providing data devices access to such systems.

BACKGROUND OF THE INVENTION

Scheduling disciplines are necessary to resolve access contention whenever multiple data devices (terminals, computers, trunks, etc.) desire access to data resources (networks, buses, trunks, etc.). Providing good service in sharing such resources is closely tied to using an appropriate scheduling discipline.

One type of scheduling discipline, called the first-come, first-served, resolves contention by queuing units of data for service in the order they are received. Another type called the head-of-the-line round-robin scheduling discipline sets up separate queues for separate channels and gives one or more quanta of service during each visit to a channel having outstanding data service requests.

In homogeneous networks, where each data device is given the same priority, the scheduling discipline should treat each data device fairly. In heterogeneous networks, where data devices have different priorities, fairness in the scheduling discipline is more difficult to achieve. A scheduling discipline, to be appropriate, may require differentiated treatment according to the priority class of data devices connected to the resource, while providing fair treatment for all data devices within any given priority class.

As a consequence of these requirements, the prior art first-come-first-served scheduling discipline does not operate fairly while the round-robin scheduling discipline is complicated and requires the use of very large memory. Thus, there is a continuing need to improve the operation of scheduling disciplines.

SUMMARY OF THE INVENTION

The present invention provides an improved scheduling discipline for interfacing data batches of a multichannel data signal to a communication facility. According to the invention, information identifying one or more data packets of each data batch is sorted into one or more of a plurality (N) of epoch queues, such that for each data batch, no information identifying more than a predetermined number (P) of data packets from a particular channel is inputted into each epoch queue. Each epoch queue is then cyclically served exhaustively by outputting the identified data packets to the facility.

In accordance with another feature of the present invention, information is sorted to an overflow queue after each epoch queue is saturated (that is, after all epoch queues are full or after each epoch queue contains information identifying P data packets from a particular channel). Subsequently, the information in the overflow queue is sorted into one or more epoch queues such that no information identifying more than P data packets from a particular data channel is inputted into the one or more epoch queues. According to yet another feature, the overflow queue is sorted into at least a first epoch queue after that epoch queue has been exhaustively served.

In one embodiment of the invention, the identification information is a pointer which identifies a location in memory where the data packet(s) themselves are stored. In another embodiment, the identification information is the data packet(s) themselves.

The invention approximates the service achieved by a head-of-the-line round-robin scheduling discipline while requiring significantly-reduced complexity and memory size. By sorting the incoming data into epoch queues, the present invention allows for full sharing of memory resources among all channels and among all priority levels. It also reduces processing and pointer overhead below that required by implementation at a head-of-the-line round-robin discipline using separate queues for separate channels. Moreover, a priority service level indicator associated with each channel enables a user to determine the number of packets P from a channel that are served during each epoch.

BRIEF DESCRIPTION OF THE DRAWING

In the drawing,

FIG. 9 depicts the state of the system after the arrival at the receiver of an illustrative batch of messages;

FIG. 10 depicts the state of the system after the first epoch queue;

FIG. 11 depicts the state of the system after the transmitter has served the overflow queue sorter;

FIG. 12 depicts the state of the system after the second epoch;

FIG. 13 depicts the state of the system after the transmitter has served the overflow queue sorter the second time;

FIG. 14 depicts the state of the system after the third epoch;

FIG. 15 depicts the state of the system after the transmitter has served the overflow queue sorter the third time;

FIG. 16 depicts the state of the system after the arrival of a single packet;

FIG. 17 depicts the state of the system after the fourth epoch;

FIG. 18 depicts the state of the system after the transmitter has served the overflow queue sorter the fourth time;

FIG. 19 depicts the state of the system after the fifth epoch; and

FIG. 20 depicts the state of the system after the sixth epoch.

DETAILED DESCRIPTION

In the following description, the first digit of reference number of an item or flow chart step indicates the figure where that item is located (i.e., item 101 is located in FIG. 1).

Figure 1:
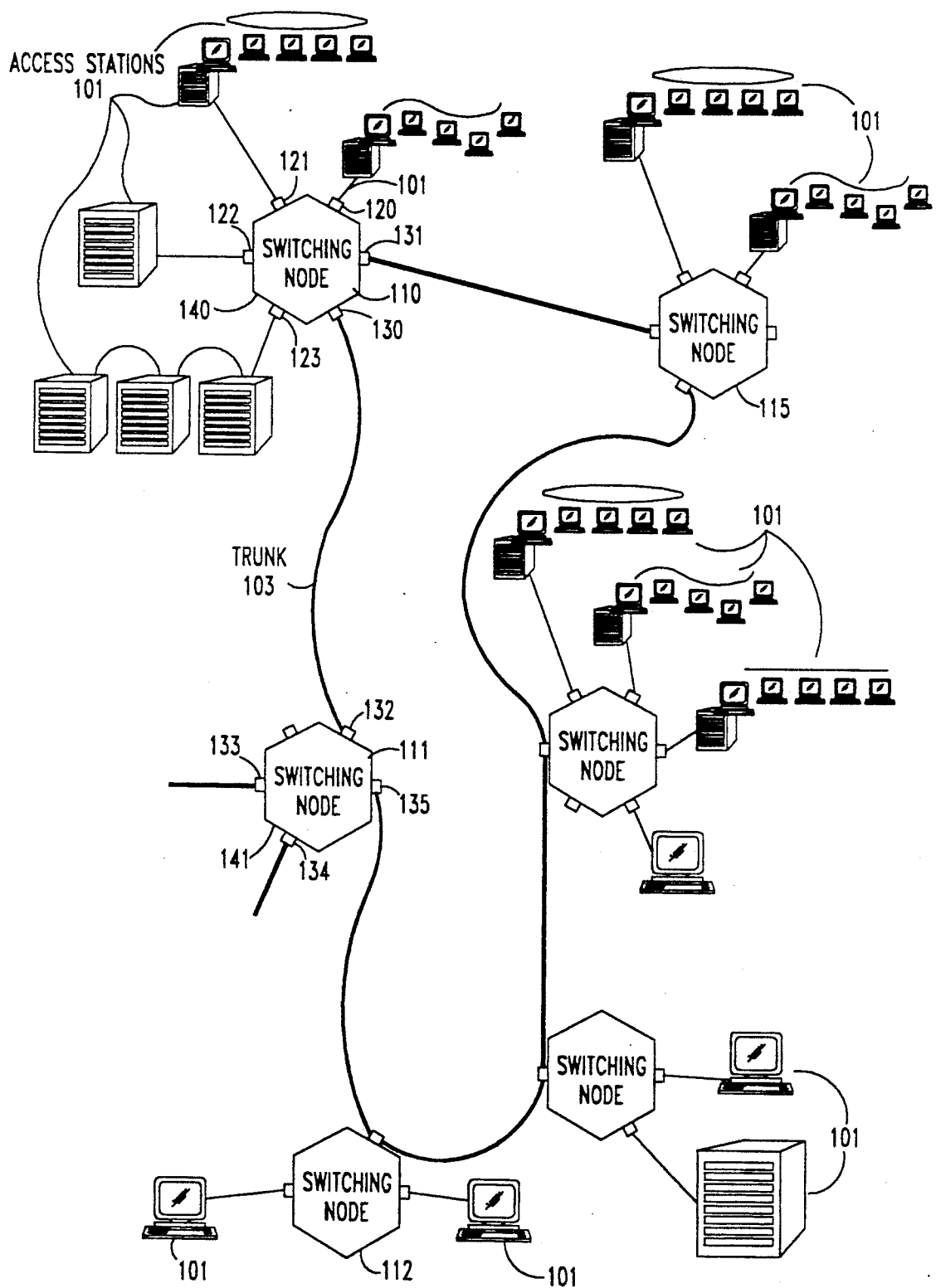
FIG. 1 illustratively shows the application of the present invention in a multiple switching node data network.

Shown in FIG. 1 is an illustration of an application of the present invention in a data network system including apparatus such as access apparatus or stations 101, switching nodes (e.g., 110-115) and trunks 103. A switching node (e.g., 110) consists of access interfaces, (e.g., 120-123) trunk interfaces (e.g., 130-135) and a backplane (e.g., 140, 141).

The access stations 101 could be PCs, workstation, hosts, supercomputers, bridges, routers, gateways, PBXs, digital video cameras, video monitors, real time monitoring devices, etc. In fact, the access stations 101 could be any device that generates digital information. The access technology used to communicate between the access stations and the access interfaces (e.g., 120) could be point-to-point links, multi-point links, local area networks, radio networks, switched services, etc.

The access interfaces usually perform the necessary steps to: receive data from the access station and, using an appropriate scheduling discipline, deliver it to the backplane; receive data from the backplane and appropriately deliver it to the access station. The necessary steps could include segmentation and reassembly of packets, address translation, protocol termination, buffering, scheduling, etc.

The trunk interfaces (e.g., 130, 132) perform the necessary steps to: receive data from the trunk and, using an appropriate scheduling discipline, deliver it to the backplane (e.g., 140, 141); receive data from the backplane and appropriately deliver it to the trunk. The necessary steps could include segmentation and reassembly of packets, buffering, scheduling, etc. The trunks may utilize various Time Division Multiplexing (TDM) formats. The trunks could be point-to-point or multi-point trunks. Multi-point trunks could be a bi-directional bus, a looped unidirectional bus, a ring bus, etc. All types of trunks could be implemented using a variety of transmission facilities, using any appropriate data speed and modulation scheme, using fiber, copper or air as the transmission medium. Different trunks do not have to be identical; they can utilize different transmission media each using different modulation schemes. Moreover, different segments of a common multi-point trunk, just like different trunks, do not have to be identical.

The backplane (e.g., 140) could be any device that performs switching or routing of packets (e.g., slotted bus, ATM switching fabrics, etc.). The backplane receives data from one access or trunk interface and delivers it to another access or trunk interface.

The system illustrated in FIG. 1 is, illustratively, representative of a general data network which may include Local Area Networks (LANs), Metropolitan Area Networks (MANs) and Wide Area Networks (WANs). All of these systems exhibit the previously-recited problems, namely increasing the efficiency of use of shared resources without incurring excessive complexity increase. Generally, the operation of the present invention is described as follows. Data packets received from access stations arrive at the backplane. The data packets are sorted into one or more of a plurality (N) of epoch queues such that no more than a predefined number P of data packets from a particular access station are stored in any particular epoch queue. When all the N epoch queues are full or saturated (i.e., containing P data packets from a particular access station) newly-received data packets are stored in an overflow queue. The epoch queues are then served to exhaustion (i.e., emptied). After each epoch queue is served the head-of-the-line data packets from the overflow queue are sorted into that epoch queue and other epoch queues, in the same manner as previously described for the newly arriving data packets.

Operating in this manner, the invention is particularly well-suited to make efficient use of buffer memory in the access and trunk interfaces. Of great relevance is the case where all the data segmentation into fixed size data cells (typically equal to a time slot of a TDM trunk) occurs at the access interfaces so that the switching, as well as the trunking scheduling, is performed on a per cell basis. Note that in the following description, the word "cell" is used interchangeably and equivalently to the word "packet".

Figure 2:
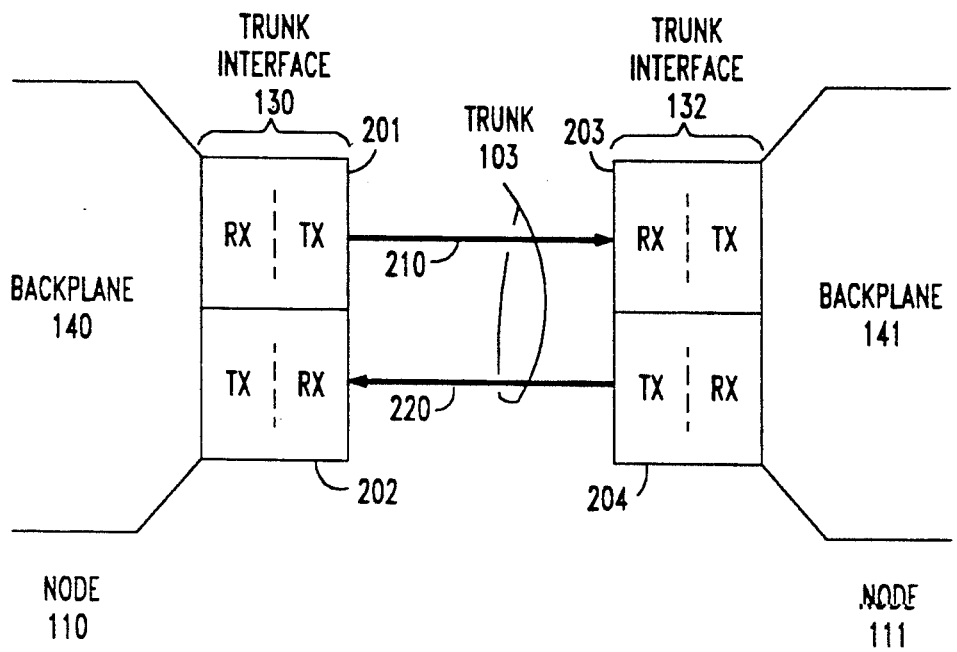
FIG. 2 shows a trunk interface used to connect a trunk to switching nodes.

Shown in FIG. 2 is an illustrative block diagram of a connection of two switching nodes 110 and 111 through a trunk 103. For the sake of simplicity, the trunk 103 is assumed to be a bi-directional bus comprising two unidirectional buses 210 and 220. There is one trunk interface at each end of the trunk. Each trunk interface (e.g., 130) includes a receiver/transmitter pair at each potential contention point, i.e., at the transition from backplane to trunk (e.g., 201) and from trunk to backplane (e.g., 202) in both directions. Thus, signals from node 110 travel via backplane 140 receiver/transmitter pair 201, trunk 103, receiver/transmitter 203 to backplane 141 of node 111. Signals from node 111 travel via backplane 141, receiver/transmitter 204, trunk 103, receiver/transmitter 202 to backplane 140 of node 110.

Figure 3:
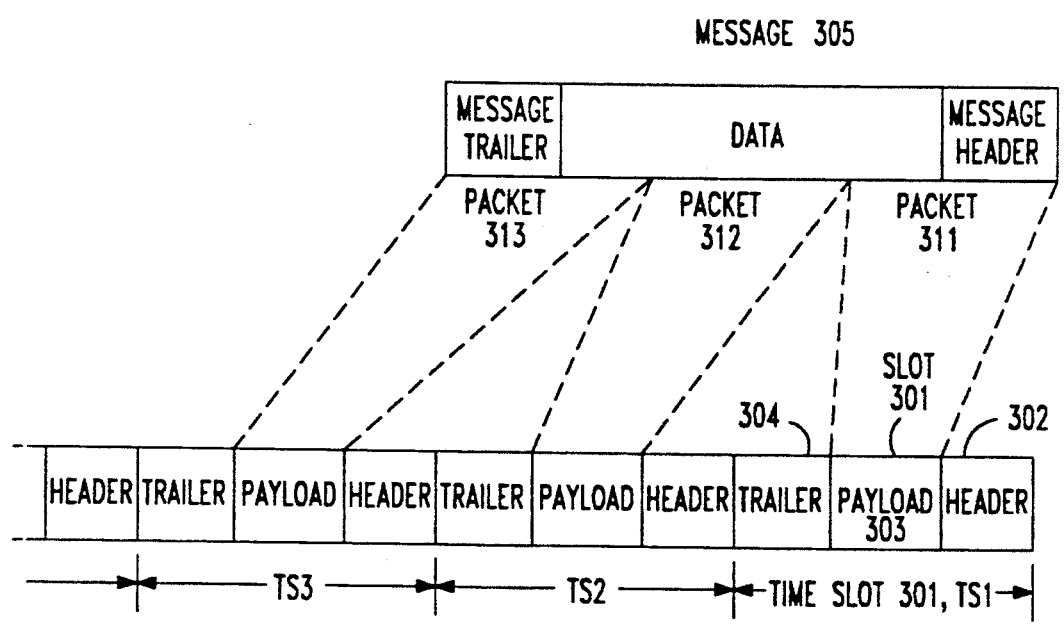
FIG. 3 shows an illustrative time slot of a slotted packet system and how a long data message is segmented into several slots for transmission.

With reference to FIG. 3, we describe an illustrative slot of a slotted packet signal which may be utilized for transmitting data over trunk 103 of the data network of FIG. 1. Note the slotted packet signal may be, for example, a Time Division Multiplex (TDM) signal. The format, illustratively, may be the IEEE 802.6 protocol. The time slot 301 (TS1) includes a header 302, payload section 303 and a trailer 304. The header 302 (sometimes further divided into header and adaptation layer) may carry multi-user access information (e.g., access control field), address information (e.g., virtual circuit identifier), message identification (e.g., MID), priority information, etc. The trailer 304 may carry error detection/correction information (e.g., cyclic redundancy code-CRC), etc. The payload 303 can be used to carry several types of data in a variety of message sizes. Variable size messages 305, (usually much larger than a slot) are segmented into several packets (311-313) which are, illustratively, transmitted in the payload section of several consecutive time slots TS1-TS3. Connectionless-type messages usually carry complete source/destination address information that can be used for routing or for scheduling decisions. Connection-oriented messages rely on the existence of a circuit (e.g., virtual circuit identifier) for routing or scheduling decisions. Channel identification can be defined in an appropriate way: for example, connection-oriented packets (i.e., time slots) from different virtual circuits and connectionless packets from different source addresses can all be assigned to different channels.

While the operation of the present invention will be described with reference to uni-directional data flow along bus 210, it should be noted that data flow in the opposite direction takes place in a similar manner. We restrict ourselves in describing the operation of the trunk interface only for carrying connectionless traffic.

In a connectionless scenario, a data batch, which includes one or more data packets, could include parts of a message (e.g., 305) or several messages. Furthermore, a data packet could be of a fixed size (i.e., a fixed number of data bits) or of a variable size (i.e., a variable number of data bits). In applications other than for connectionless networks, data batches and data packets can be formed of data bits representing digital representations of voice or video information.

Figure 4:
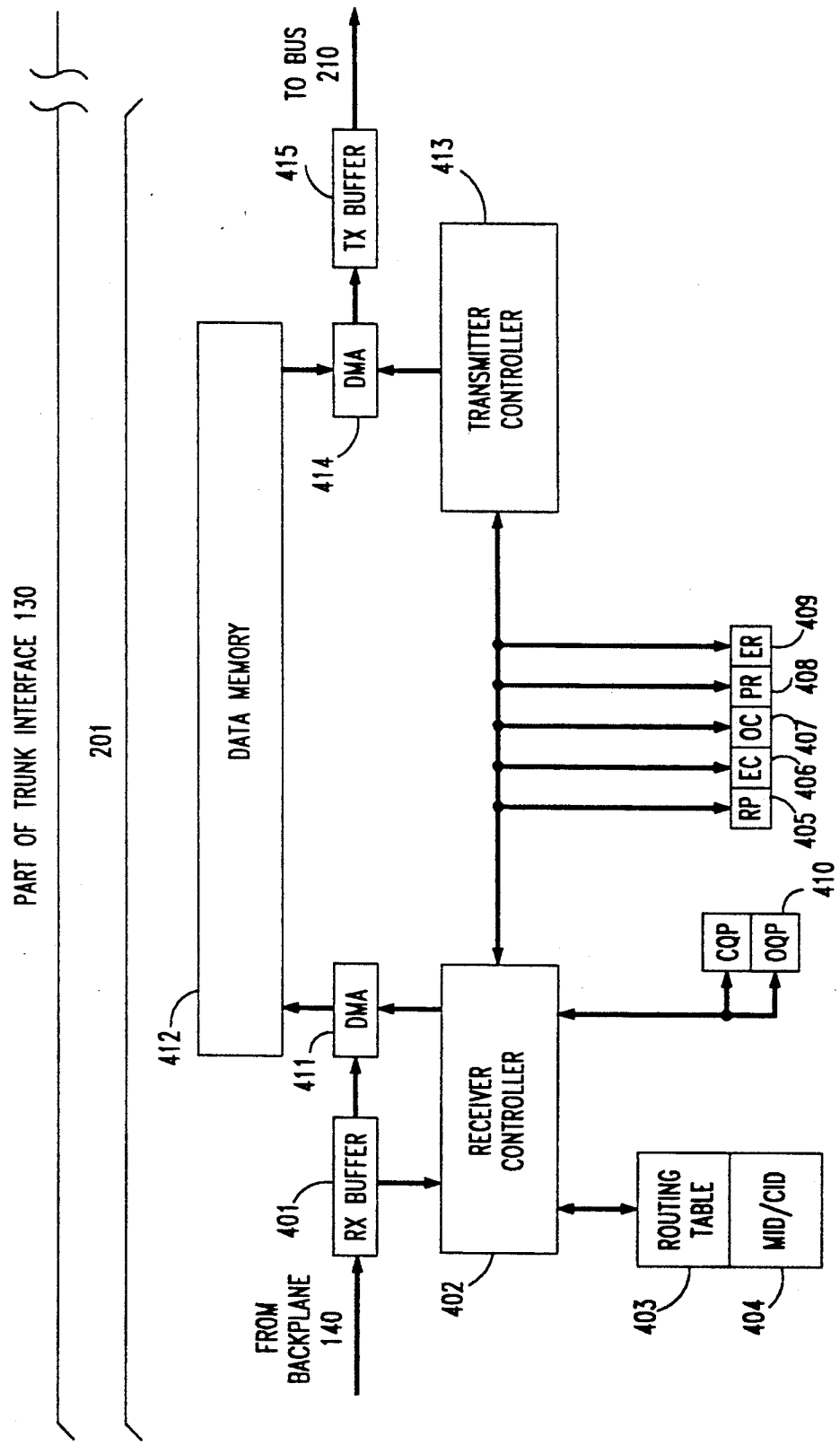
FIG. 4 shows a functional block diagram of a receiver/transmitter pair of a trunk interface of FIG. 2.

Shown in FIG. 4 is a functional block diagram of a receiver/transmitter pair 201 of trunk interface 130 of FIG. 2. Transmission takes place in the direction from switching node 110 to trunk 103. There is an input from the backplane 140 into trunk interface 130 and the received data is stored at the receiver buffer 401. As soon as the header of an incoming packet (e.g., 311) has been received, the receiver controller 402 verifies if the incoming cell is a Beginning of Message (BOM), a Continuation of Message (COM) or an End of Message (EOM). If the incoming packet is found to be a BOM, the receiver controller 402 waits until the Message IDentifier (MID), in the adaptation layer, and the destination address, in the data field, have been received. The receiver controller 402 then checks, in a wellknown manner, in the routing table 403 to determine if the destination address can be reached through this trunk. If that particular destination address is found in the routing table 403, the corresponding Channel Identifier (CID) is calculated and assigned to the packet's MID in table 404. Otherwise, the received packet is disregarded. If the incoming packet is found to be a COM or an EOM, its corresponding channel identifier is retrieved from table 404. If the retrieved channel identifier is not valid (e.g., equals to FFFF hex), the packet is disregarded. If the incoming packet is found to be an EOM and the channel identifier is valid, an invalid channel identifier is assigned to the packet's MID in table 404.

Once the channel identifier associated with a packet is found, the receiver controller is ready to schedule the transmission of that packet. The receiver controller 402 retrieves and updates all the state information with respect to the channel identifier (i.e., registers 405, 406, 407, 408, 409, 410) to determine the identifier information (i.e., a pointer to a memory location where the packet should be stored). That identifier information is passed to the receiver Direct Memory Access (DMA) device 411 and the packet is appropriately stored in one of the N epoch queues (507-509) or the overflow queue 510 (as discussed later) in memory 412.

Once it is time for the transmission of a packet, the transmitter 413 retrieves and updates all the state information with respect to the packet to be transmitted. The transmitter controller 413 passes the identifier information (i.e., a pointer to one or more data packets) to the transmitter DMA device 414 and the appropriate packet(s) is transferred to the transmitter buffer 415. The packet(s) is then transmitted onto the trunk.

In this manner, the transmitter controller 413 sequentially serves all of the epoch queues (507-509) each to exhaustion. Every time the transmitter controller 413 exhausts a epoch queue, the overflow queue sorter is activated, and the head of the line in the overflow queue is repeatedly served and placed in the epoch queues, in a way similar to how the receiver controller 402 handles arriving packets. The transmitter controller 413 serves the next epoch queue either when all epoch queues are saturated with packets from the same channel as the packet currently at the head of the overflow queue or when some other predetermined event has taken place. Such a predetermined event may be, for example, when the transmit buffer 415 becomes empty, in which case the transmitter controller 413 immediately transfers a packet to the transmit buffer 415 so the trunk or bus 210 remains utilized.

The functional blocks shown in FIG. 4 can be implemented using one or more integrated circuit chips using well-known Complementary Metal Oxide Semi-Conductors (CMOS), Very Large Scale Integrated (VLSI), Emitter Coupled Logic (ECL) or hybrid circuit technology. It is anticipated that other embodiments using any well-known semi-conductor technology can be utilized. The interface to the receiver buffer can be an optical integrator, a matched filter or any appropriate device for the combination of the backplane physical media and the modulation. The receiver buffer 401 can be made using shift registers or very fast Random Access Memory (RAM). The receiver controller 402 and the transmitter controller 413 can be built using a VLSI circuit-implemented finite state machine, a Reduced Instruction Set Controller (RISC)-based microprocessor or any conventional microprocessors. The registers 405, 406, 407, 408, 409 and 410 as well as the data memory 412, can be made using very fast RAM such as a 1M bit DRAM, e.g., Siemens HYB511000-60.

Figure 5:
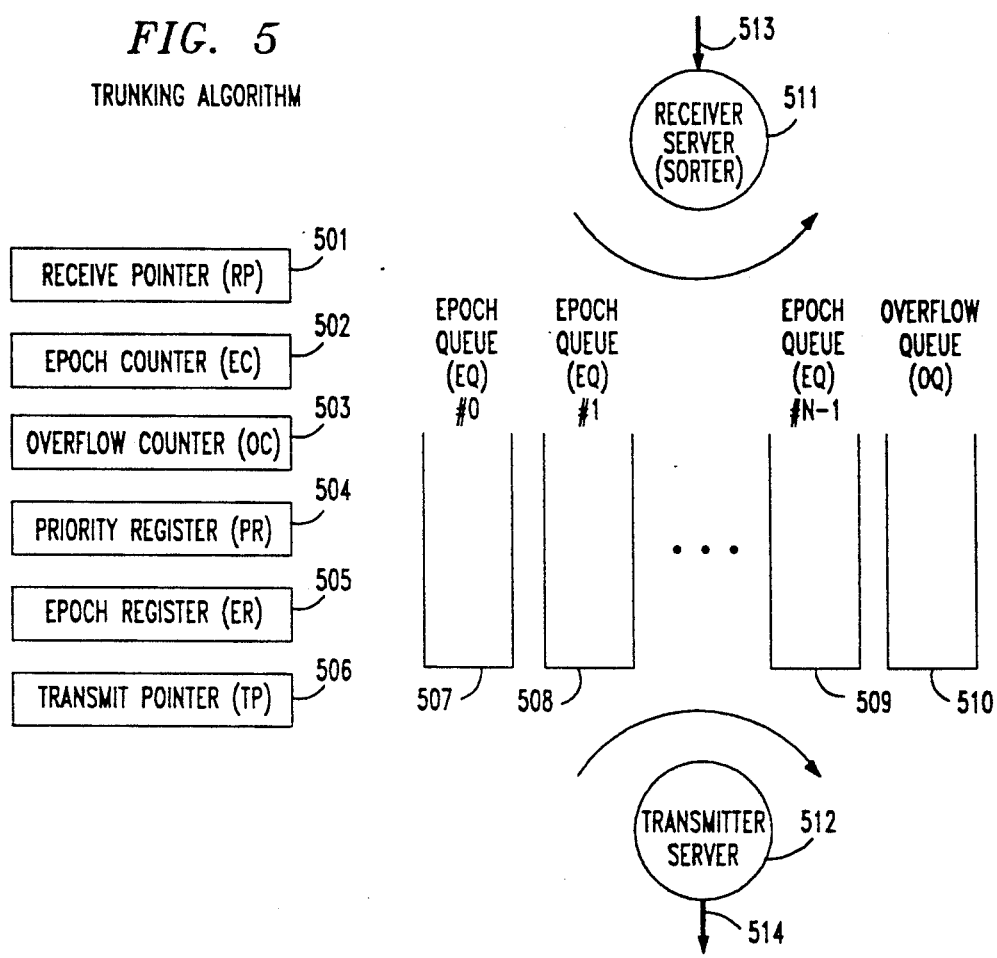
FIG. 5 shows, illustratively, operation units of a receiver/transmitter pair of a trunk interface useful in describing the present invention.

FIG. 5 shows, symbolically, the various operating units of the system which is helpful in understanding the illustrative embodiment of the invention. The algorithm utilized by the present invention requires a receiver server, or sorter, 511; a transmitter server 512; N epoch queues (EQ) 507 to 509; one overflow queue (OQ) 510; and several per channel pointers including receive pointer (RP) 501, epoch counter (EC) 502, overflow counter (OC) 503, priority register (PR) 504, epoch register (ER) 505, and a transmit pointer (TP) 506.

Pointer 501 corresponds to the receive pointer (RP), which is used by an overflow queue sorter in receiver server 511 to decide in which epoch queue 507-509 a packet (i.e., a time slot) from a particular channel is to be placed. Pointer 502 corresponds to the epoch counter (EC); its purpose is to count the number of packets from each channel stored in the ensemble of epoch queues 507-509. Pointer 503 corresponds to the overflow counter (OC); its purpose is to count the number of packets from each channel stored in the overflow queue. Pointer 504 corresponds to the priority register (PR); it stores preassigned values of channel proportional priority. Pointer 505 corresponds to the epoch register (ER); its purpose is to count the number of packets from each channel stored in the epoch queue that is currently identified by RP. Pointer 506 corresponds to the transmit pointer (TP); it is used by a selector in transmitter 512 to decide from which of the N epoch queues, 507-509, to select a packet.

Receiver 511 receives a plurality of communication channels over one or more facilities 513. Receiver 511 distributes or sorts time slot data from a given channel to either an associated one of the N epoch queues 507 to 509, or to overflow queue 510. Transmitter 512 collects time slot data from the N epoch queues 507 to 509. Receiver 511, transmitter 512 or an independent processor then sorts the time slot data from overflow queue 510 to the N epoch queues 507 to 509. Transmitter 512 then transmits the time slot data for each channel over one of the one or more facilities 514. Note that the N epoch queues 507 to 509 and the overflow queue 510 may contain actual received data or a list of pointers to the actual location of data in the system memory.

Note that in an actual application, all these queues (i.e., N epoch queues 507 to 509 overflow queue 510) are finite. In that case, in order to minimize data loss when the selected epoch queue happens to be full, the information identifying data or the data packets themselves can be placed in another available epoch queue or in the overflow queue instead of being discarded or dropped. Additionally, when the system memory is nearly full, i.e., it has reached a predetermined occupancy threshold, new messages received by the system may be dicarded so as to diminish the chances of discarding the remaining parts of messages that already have been received by the system.

Figure 7:
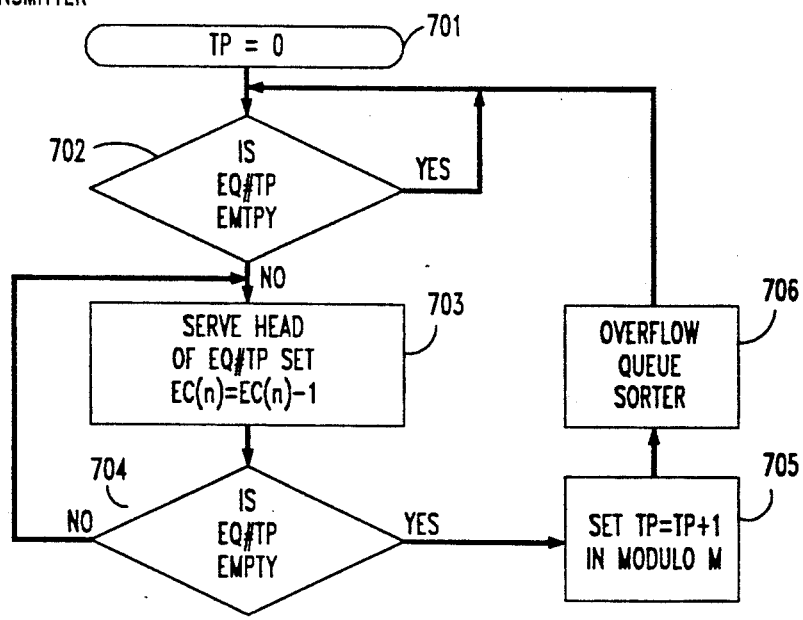
FIGS. 6–8 show operational flow diagrams of the system which describe the operation, respectively, at the receiver, transmitter and overflow queue sorter.
Figure 6:
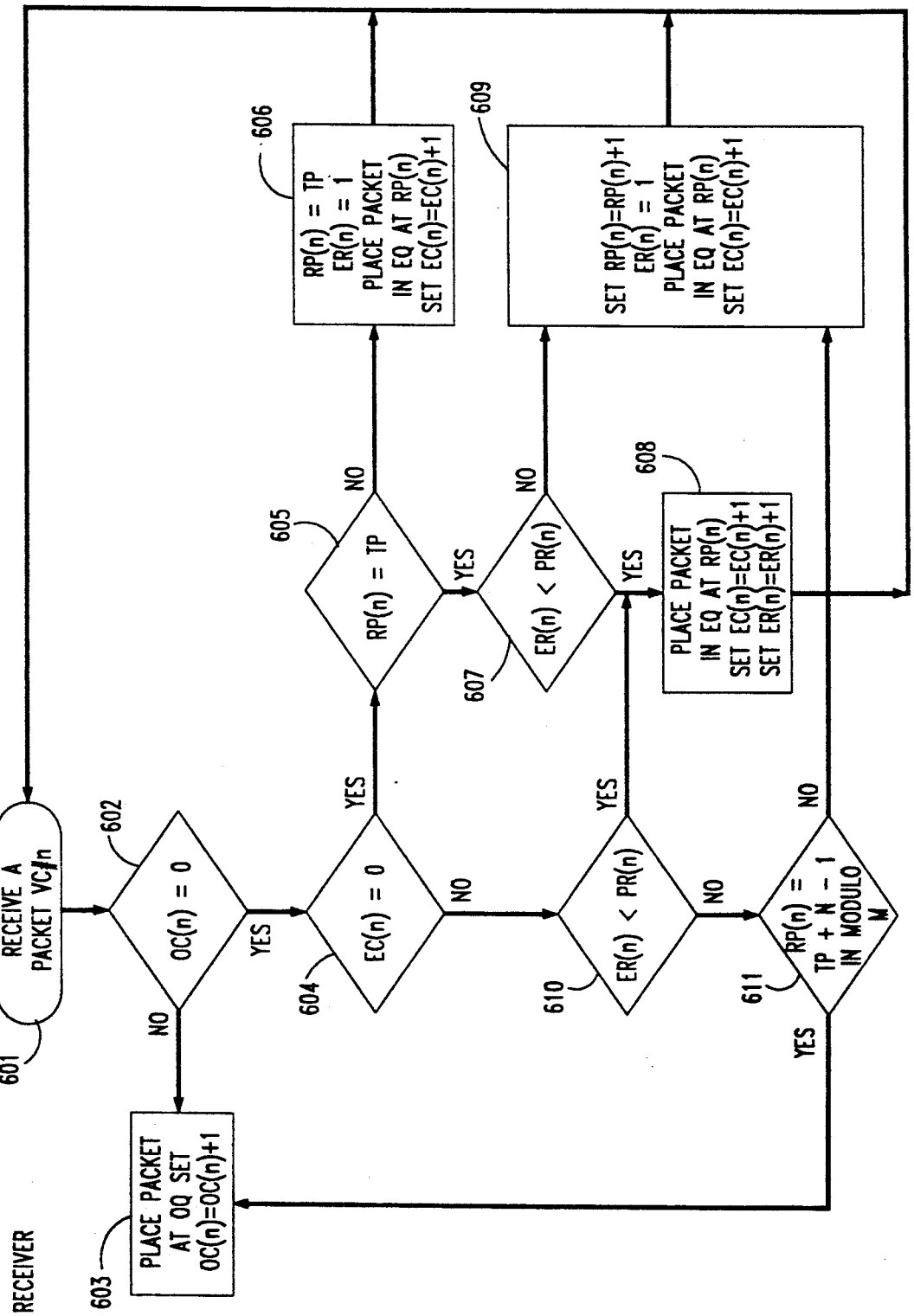
Figure 8:
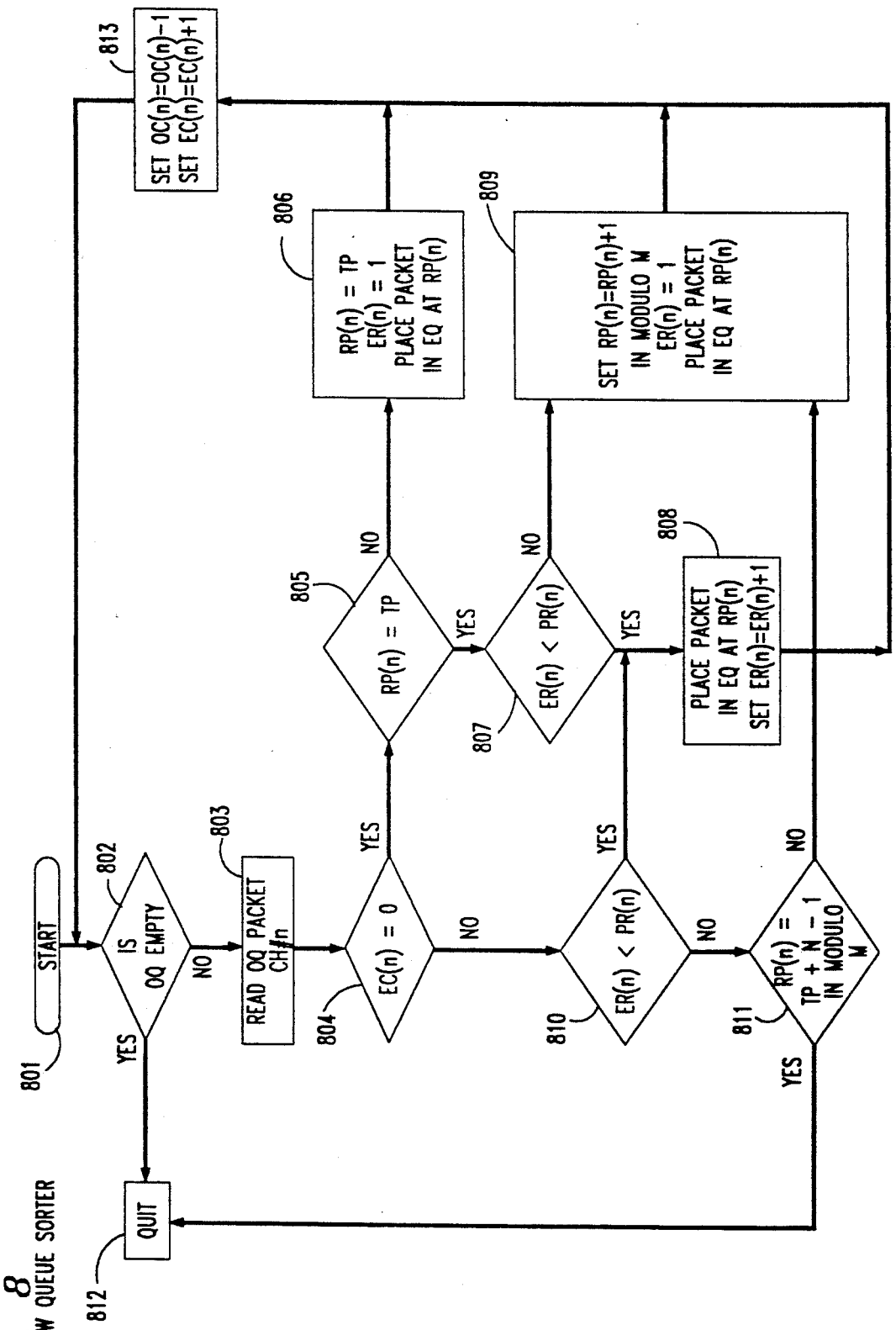

FIGS. 6, 7, and 8 depict operational flow diagrams which describe the operation of the receiver 511, transmitter 512 and the overflow queue sorter 510, respectively.

In the operational description we utilize the following nomenclature. For channel n, we let $RP(n)$ denote the value of the Receiver Pointer, $EC(n)$ denote the value of the epoch counter, $OC(n)$ denote the value of the overflow counter, $PR(n)$ denote the value of the priority register, and $ER(n)$ denote the value of the epoch register.

Using the trunking algorithm shown in FIG. 5, a situation may occur where the system may attempt to place more than P data packets from a particular data channel into one epoch queue. To avoid that event, a procedure like that in FIG. 6 is implemented as explained shortly. For example, if there are no data packets from a particular channel in the system, then the system may assume that no data packet from that data channel has been transmitted in the current epoch. However, the following sequence could also have happened, namely, a data packet from channel i arrives, a data packet from channel j arrives and then another data packet from channel i arrives after the first packet from channel i has already been served or transmitted. Note that when this event occurs, the transmit pointer and the receive pointer for data channel i will have the same value. Therefore, if when a data packet from channel i arrives and finds the system empty of data packets from channel i, step 604, and if the receive pointer 501 is equal to the transmit pointer 506, very likely the above-mentioned event would have happened. In that case, the data packet may be placed in the next epoch queue, steps 605, 607 and 609. However, this may generate another problem since it could be that the transmit and receive pointers are equal by pure chance. In that case, one can minimize the probability of such a "pure chance" event happening by making the state space (i.e., the number of possible values of the transmit and receive pointers) very large and not closely tied to the number N of epoch queues. This is achieved by making the number of possible values for the transmit and receiver pointers equal to M, with M being an integer multiple of N. Thus, the transmit and receive pointers are essentially modulo M counter. Therefore, the probability of misplacing a data packet becomes equal to one over M which can be made as small as desired by increasing M accordingly.

Illustratively, consider a case where there are three epoch queues (i.e., N=3), $PR(n)=1$ for all values of n not equal to m and when n=m then $PR(m)=2$. What this means is that the system handles one packet of data from each channel i, j and k but handles two packets at a time from channel m. Thus, channel m data is given priority over data from channels i, j and k. The assignment of values of $PR(n)$ is based on the desire to differentiate the service of any particular channel relative to others. The value $PR(n)$ can be used to identify classes of services so that a premium can be charged to data channels for the preferred service, i.e., a higher data transmission rate.

Assume, during our illustrative time period of observation, that a batch formed by packets from channel i (i.e., $i_1, i_2, i_3, i_4, i_5, i_6$ and $i_7$), packets from channel j (i.e., $j_1, j_2, j_3$ and $j_4$), a packet from channel k (i.e., $k_1$) and packets from channel m (i.e., $m_1, m_2, m_3$ and $m_4$), arrive to the receiver 511 in the following order: $i_1, i_2, i_3, i_4, i_5, i_6, i_7, j_1, j_2, k_1, j_3, j_4, m_1, m_2, m_3$ and $m_4$. The packets $i_1$–$i_7$ represent a batch from channel i, the packets $j_1 j_2$ represent a batch from channel j, the packet $k_1$ represents a packet from channel j, the packets $j_3,j_4$ represent a second batch from channel j and $m_1$–$m_4$ represent a batch from channel m. Note each packet of data represents a fixed number of data bits, typically, each packet of data is equal in size to a time slot of the slotted packet facility used to transport the data. We also assume that the system is empty (i.e., there are no packets in the system and all pointers are set at zero) at the time the batch with messages arrives.

In step 601, the first packet, packet $i_1$, arrives at receiver 511. A test is performed in step 602 to check if $OC(i)=0$. Since there are no packets from channel i in the overflow queue 510, the answer is yes and another test is performed, step 604, to check if $EC(i)=0$. Since there are no packets from channel i in the epoch queues 507–509, the answer is yes and another test is performed, step 605, to check if $RP(i)=TP$. Since all pointers are set to zero at this point, the answer is yes and another test is performed, step 607, to check if $ER(i)<PR(i)$. Since no packets from channel i have been placed in the epoch queue pointed by $RP(i)$, therefore $ER(i)=0$ is less than $PR(i)$, which has been set to one; the answer is yes and step 608 is performed. Packet $i_1$ is therefore placed in the epoch queue pointed by $RP(i)$, which is epoch queue #0, 507 (as shown in FIG. 9), and the values of $EC(i)$ and $ER(i)$ are incremented to 1. The above-described process is repeated when each packet arrives at receiver 511.

Packet $i_2$ arrives to receiver 511 in step 601. In step 602, a test is performed to check if $OC(i)=0$. Since there are no packets from channel i in the overflow queue 510, the answer is yes and step 604 is performed to check if $EC(i)=0$. Since there is one packet from channel i in the epoch queues (i.e., 507) the answer is no, and step 610 is performed to check if $ER(i)<PR(i)$. Since one packet from channel i has been placed in the epoch queue pointed by $RP(i)$, $ER(i)=PR(i)=1$; the answer is no and step 611 is performed to check if $RP(i)=TP+2$. Since $RP(i)=0$ and $TP+2=2$, the answer is no, step 609 is performed. $RP(i)$ is incremented to one, $ER(i)$ is assigned the value of one, packet $i_2$ is placed in the epoch queue pointed by $RP(i)$, which is epoch queue #1, 508, (as shown in FIG. 9), and the value of $EC(i)$ is incremented to 2.

Packet $i_3$ arrives to receiver 511, in step 601. A test is performed, step 602, to check if $OC(i)=0$. Since there are no packets from channel i in the overflow queue 510, the answer is yes and step 604 is performed to check if $EC(i)=0$. Since there are two packets from channel i in the epoch queues the answer is no, and step 610 is performed to check if $ER(i)<PR(i)$. Since one packet from channel i has been placed in the cycle queue pointed by RP(i), ER(i)=PR(i)=1; the answer is no and step 611 is performed to check if RP(i)=TP+2. Since RP(i)=1 and TP+2=2, the answer is no and step 609 is performed. RP(i) is incremented to two, ER(i) is assigned the value of one, packet $i_3$ is placed in the epoch queue pointed by RP(i), which is epoch queue #2, 509 (as shown in FIG. 9), and the value of EC(i) is incremented to 3.

Packet $i_4$ arrives to receiver 511, in step 601. A test is performed, step 602, to check if OC(i)=0. Since there are no packets from channel i in the overflow queue, the answer is yes and step 604 is performed to check if EC(i)=0. Since there are three packets from channel i in the epoch queues the answer is no, and step 610 is performed to check if ER(i)<PR(i). Since one packet from channel i has been placed in the epoch queue pointed by RP(i), ER(i)=PR(i)=1; the answer is no and step 611 is performed to check if RP(i)=TP+2. Since RP(i)=2 and TP+2=2, the answer is yes and step 603 is performed. Packet $i_4$ is placed in the overflow queue 510 (as shown in FIG. 9), and the value of OC(i) is incremented to 1.

Packet $i_5$ arrives to the receiver 511, in step 601. A test is performed, step 602 to check if OC(i)=0. Since there is one packet from channel i in the overflow queue 510, the answer is no and packet $i_5$ is placed in the overflow queue, 510, and the value of OC(i) is incremented to 2.

Packet $i_6$ arrives to the receiver 511 in step 601. A test is performed, step 602, to check if OC(i)=0. Since there are two packets from channel i in the overflow queue 510, the answer is no and packet $i_6$ is placed in the overflow queue 510, and the value of OC(i) is incremented to 3.

Packet $i_7$ arrives to the receiver, 511, in step 601. A test is performed, at step 602, to check if OC(i)=0. Since there are three packets from channel i in the overflow queue 510, the answer is no and packet $i_7$ is placed in the overflow queue, 510, and the value of OC(i) is incremented to 4.

Packet $j_1$ arrives to the receiver 511, in step 601. A test is performed, step 602, to check if OC(j)=0. Since there are no packets from channel j in the overflow queue 310, the answer is yes and step 604 is performed to check if EC(j)=0. Since there are no packets from channel j in the epoch queues, the answer is yes and step 605 is performed to check if RP(j)=TP. Since all pointers are set to zero at this point, the answer is yes and step 607 is performed to check if ER(j)<PR(j). Since no packets from channel j have been placed in the epoch queue pointed by RP(j) (i.e., 507), therefore ER(j)=0 is less than PR(j), which has been set to one; the answer is yes and step 608 is performed. Packet $j_1$ is, therefore, placed in the epoch queue pointed by RP(j), which is epoch queue #0, 507, and the values of EC(j) and ER(j) are incremented to 1.

Packet $j_2$ arrives to the receiver 511, in step 601. A test is performed, step 602, to check if OC(i)=0. Since there are no packets from channel j in the overflow queue 510, the answer is yes and step 604 is performed to check if EC(j)=0. Since there is one packet from channel j in the epoch queues the answer is no, and step 610 is performed to check if ER(j)<PR(j). Since one packet from channel j has been placed in the epoch queue pointed by RP(j), ER(j)=PR(j)=1; the answer is no and step 611 is performed to check if RP(j)=TP+2. Since RP(j)=0 and TP+2=2, the answer is no, and step 609 is performed. RP(j) is incremented to one, ER(j) is assigned the value of one, packet $j_2$ is placed in the epoch queue pointed by RP(j), which is epoch queue #1, 508, and the value of EC(j) is incremented to 2.

Packet $k_1$ arrives to the receiver 511, in step 601. A test is performed, step 602, to check if OC(k)=0. Since there are no packets from channel k in the overflow queue, the answer is yes and step 604 is performed to check if EC(k)=0. Since there are no packets from channel k in the epoch queues, the answer is yes and step 605 is performed to check if RP(k)=TP. Since all pointers from channel k are set to zero at this point, the answer is yes and step 607 is performed to check if ER(k)<PR(k). Since no packets from channel k have been placed in the epoch queue pointed by RP(k), therefore ER(k)=0 is less than PR(k), which has been set to one; the answer is yes and step 608 is performed. Packet $k_1$ is, therefore, placed in the epoch queue pointed by RP(k), which is epoch queue #0, 507, and the values of EC(k) and ER(k) are incremented to 1.

Packet $j_3$ arrives to the receiver 511, in step 601. A test is performed, at step 602, to check if OC(j)=0. Since there are no packets from channel j in the overflow queue, the answer is yes and step 604 is performed to check if EC(j)=0. Since there are two packets from channel j in the epoch queues the answer is no, and step 610 is performed to check if ER(j)<PR(j). Since one packet from channel j has been placed in the epoch queue pointed by RP(j), ER(j)=PR(j)=1; the answer is no and step 611 is performed to check if RP(j)=TP+2. Since RP(j)=1 and TP+2=2, the answer is no and step 609 is performed. RP(j) is incremented to two, ER(j) is assigned the value of one, packet $j_3$ is placed in the epoch queue pointed by RP(j), which is epoch queue #2, 509, and the value of EC(j) is incremented to 3.

Packet $j_4$ arrives to the receiver 511, in step 601. A test is performed, at step 602, to check if OC(j)=0. Since there are no packets from channel j in the overflow queue, the answer is yes and step 604 is performed to check if EC(j)=0. Since there are three packets from channel j in the epoch queues the answer is no, and step 610 is performed to check if ER(j)<PR(j). Since one packet from channel j has been placed in the epoch queue pointed by RP(j), ER(j)=PR(j)=1; the answer is no and step 611 is performed to check if RP(j)=TP+2. Since RP(j)=2 and TP+2=2, the answer is yes and step 603 is performed. Packet $j_4$ is placed in the overflow queue 510, and the value of OC(j) is incremented to 1.

Packet $m_1$ arrives to the receiver 511, in step 601. A test is performed, step 602, to check if OC(m)=0. Since there are no packets from channel m in the overflow queue, the answer is yes and step 604 is performed to check if EC(m)=0. Since there are no packets from channel m in the epoch queues, the answer is yes and step 605 is performed to check if RP(m)=TP. Since all pointers are set to zero at this point, the answer is yes and step 607 is performed to check if ER(m)<PR(m). Since no packets from channel m have been placed in the epoch queue pointed by RP(m), therefore ER(m)=0 is less than PR(m), which has been set to two; the answer is yes and step 608 is performed. Packet $m_1$ is, therefore, placed in the epoch queue pointed by RP(m), which is epoch queue #0, 507, and the values of EC(m) and ER(m) are incremented to 1.

Packet $m_2$ arrives to the receiver 511, in step 601. A test is performed, step 602 to check if OC(m)=0. Since there are no packets from channel m in the overflow queue, the answer is yes and step 604 is performed to check if EC(m)=0. Since there is one packet from channel m in the epoch queues the answer is no, and step 610 is performed to check if ER(m)<PR(m). Since one packet from channel m has been placed in the epoch queue pointed by RP(m), ER(m)=1 and PR(m)=2; the answer is yes and step 608 is performed. Packet $m_2$ is, therefore, placed in the epoch queue pointed by RP(m), which is epoch queue #0, 507, and the values of EC(m) and ER(m) are incremented to 2. Since both packet $m_1$ and $m_2$ are stored in epoch queue #0, 507, channel m will be served at a priority rate which is two times the data rate of other channels i, j and k.

Packet $m_3$ arrives to the receiver 511, in step 601. A test is performed, step 502, to check if OC(m)=0. Since there are no packets from channel m in the overflow queue, the answer is yes and step 604 is performed to check if EC(m)=0. Since there are two packets from channel m in the epoch queues the answer is no, and another test is performed, step 610, to check if ER(m)<PR(m). Since two packets from channel m have been placed in the epoch queue pointed by RP(m), ER(m)=PR(m)=2; the answer is no and another test is performed, at step 611, to check if RP(m)=TP+2. Since RP(m)=0 and TP+2=2, the answer is no and step 609 is performed. RP(m) is incremented to one, ER(m) is assigned the value of one, packet $m_3$ is placed in the epoch queue pointed by RP(m), which is epoch queue #1, step 508, and the value of EC(m) is incremented to 3.

Packet $m_4$ arrives to the receiver 511, in step 601. A test is performed, step 602, to check if OC(m)=0. Since there are no packets from channel m in the overflow queue, the answer is yes and another test is performed, step 604, to check if EC(m)=0. Since there are three packets from channel m in the epoch queues the answer is no, and another test is performed at step 610 to check if ER(m)<PR(m). Since one packet from channel m has been placed in the epoch queue pointed by RP(m), ER(m)=1, PR(m)=2; the answer is yes and step 608 is performed. Packet $m_4$ is, therefore, placed in the epoch queue pointed by RP(m), which is epoch queue #1, 508, the value of EC(m) is incremented to 4 and the value of ER(m) is incremented to 2.

FIG. 9 depicts the state of the system at the end of the batch arrival. Pointers 501, 502, 503, 504, 505 and 506 depict for the relevant channels (i.e., i, j, k and m), the values of the receive pointer, epoch counter, overflow counter, priority register, epoch register and transmit pointer, respectively. Items 507, 508 and 509 depict the epoch queues #0, #1 and #2, (i.e., 507, 508 and 509) respectively with the packets stored in them. Overflow queue OC, 510, is shown with the packets stored in it.

The transmitter 512 had initiated the transmit pointer 506 to zero at startup, step 601. The transmitter then checks, at the beginning of service epoch (i.e., beginning of an outgoing slot), at 702 if the epoch queue pointed by the transmit pointer (i.e., EO#TP or EQ(O)) is empty. After the arrival of the above described batch, the transmitter 512 will find the system not empty. Consequently, at 703, the transmitter 512 serves the packet at the head of the line in epoch queue 507 pointed by the transmit pointer. Packet $i_1$ is transferred to the outgoing time slot on facility 514, EC(i) is decremented to 2 and another test is performed, step 704, to check if the epoch queue pointed by the transmit pointer (i.e., EQ(TP)) is empty. The answer is no and, at step 703, the transmitter serves the packet at the head of the line in the epoch queue pointed by the transmit pointer, i.e., epoch queue #0, 507. Packet $j_1$ is transferred to the outgoing slot, EC(j) is decremented to 2 and another test is performed, at step 704, to check if the epoch queue pointed by the transmit pointer (i.e., EQ(TP)) is empty. The answer is no and, at step 703, the transmitter serves the packet at the head of the line in the epoch queue pointed by the transmit pointer, i.e., epoch queue #0, 507. Packet $k_1$ is transferred to the outgoing slot, EC(k) is decremented to 0 and another test is performed, at step 704, to check if the epoch queue pointed by the transmit pointer (i.e., EQ(TP)) is empty. The answer is no and, at step 703, the transmitter serves the packet at the head of the line in the epoch queue pointed by the transmit pointer, i.e., epoch queue #0, 507. Packet $m_1$ is transferred to the outgoing slot, EC(m) is decremented to 3 and another test is performed, at step 704 to check if the epoch queue pointed by the transmit pointer (i.e., EQ(TP)) is empty. The answer is no and, at step 703, the transmitter serves the packet at the head of the line in the epoch queue pointed by the transmit pointer, i.e., epoch queue #0, 507. Packet $m_2$ is transferred to the outgoing slot, EC(m) is decremented to 2 and another test is performed, at step 704, to check if the epoch queue pointed by the transmit pointer (i.e., EQ(TP)) is empty. The answer is yes and, in step 705, the transmitter increments the transmit pointer to TP=1, in step 706, and initiates the overflow queue sorter.

FIG. 10 depicts the state of the system at the end of the first cycle. At step 801, the overflow queue sorter 510 starts its operation. A test is performed, at step 802 to check if the overflow queue 510 is empty. The answer is no and, at step 803, the channel number of the head-of-the-line packet in the overflow queue (i.e., i) is read. A test is performed, at step 804, to check if EC(i)=0. Since there are two packets from channel i in the epoch queues the answer is no, and another test is performed, at step 810, to check if ER(i)<PR(i). Since one packet from channel i has been placed in the epoch queue pointed by RP(i), ER(i)=PR(i1; the answer is no and another test is performed, at step 811, to check if RP(i)=TP+2. Since RP(i)=2 and TP+2=3, the answer is no and step 809 is performed. RP(i) is incremented to three, ER(i) is assigned the value of one, packet $i_4$ is placed in the epoch queue pointed by RP(i), which is epoch queue #0, 507. At step 813 the value of EC(i) is incremented to 3 and the value of OC(i) is decremented to 3. Another test is performed at step 802 to check if the overflow queue, 510 is empty. The answer is no and, at step 803, the channel number of the head-of-the-line packet in the overflow queue (i.e., i) is read. A test is performed, at step 804, to check if EC(i)=0. Since there are three packets from channel i in the epoch queues the answer is no, and another test is performed, at step 810, to check if ER(i)<PR(i). Since one packet from channel i has been placed in the epoch queue pointed by RP(i), ER(i)=PR(i)=1; the answer is no and another test is performed, at step 811, to check if RP(i)=TP+2. Since RP(i)=3 and TP+2=3, the answer is yes and step 812 is performed and the overflow queue sorter quits.

FIG. 11 depicts the state of the system after the operation of the overflow queue sorter. The transmitter resumes operation, step 701, and checks, in step 702, at the beginning of service epoch (i.e., beginning of an outgoing slot), if the epoch queue pointed by the transmit pointer (i.e., EQ(TP)) is empty. Since epoch queue #1, 508, is not empty the answer is no and, at step 703, the transmitter serves the packet at the head of the line. Packet $i_2$ is transferred to the outgoing slot, EC(i) is decremented to 2 and another test is performed, at step 704, to check if the epoch queue pointed by the transmit pointer (i.e., EQ(TP)) is empty. The answer is no and, at step 703, the transmitter serves the packet at the head of the line in the epoch queue pointed by the transmit pointer, i.e., #1, 508. Packet $j_2$ is transferred to the outgoing slot, EC(j) is decremented to 1 and another test is performed, at step 704, to check if the epoch queue pointed by the transmit pointer (i.e., EQ(TP)) is empty. The answer is no and, at step 703, the transmitter serves the packet at the head of the line in the epoch queue pointed by the transmit pointer, i.e., #1, step 508. Packet $m_3$ is transferred to the outgoing slot, EC(m) is decremented to 1 and another test is performed, at step 704, to check if the epoch queue pointed by the transmit pointer (i.e., EQ(TP)) is empty. The answer is no and, at step 703, the transmitter serves the packet at the head of the line in the epoch queue pointed by the transmit pointer, i.e., #1, step 508. Packet $m_4$ is transferred to the outgoing slot, EC(m) is decremented to 0 and another test is performed, at step 704, to check if the epoch queue pointed by the transmit pointer (i.e., EQ(TP)) is empty. The answer is yes, and the transmitter increments the transmit pointer to TP=2, at step 705, and initiates the overflow queue sorter at step 706.

FIG. 12 depicts the state of the system at the end of the second cycle. A test is performed, at step 802, to check if the overflow queue 510 is empty. The answer is no and, at step 803, the channel number of the head-of-the-line packet in the overflow queue (i.e., i) is read. A test is performed, at step 804, to check if EC(i)=0. Since there are two packets from channel i in the cycle queues the answer is no, and another test is performed, at step 810, to check if ER(i)<PR(i). Since one packet from channel i has been placed in the epoch queue pointed by RP(i), ER(i)=PR(i)=1; the answer is no and another test is performed, at step 811, to check if RP(i)=TP+2. Since RP(i)=3 and TP+2=4, the answer is no and step 809 is performed. RP(i) is incremented to four, ER(i) is assigned the value of one, packet $i_5$ is placed in the cycle queue pointed by RP(i), which is cycle queue #1, 508. At step 813, the value of EC(i) is incremented to 3 and the value of OC(i) is decremented to 2. Another test is performed, at step 802, to check if the overflow queue 510 is empty. The answer is no and, at step 803, the channel number of the head-of-the-line packet in the overflow queue (i.e., i) is read. A test is performed, at step 804, to check if EC(i)=0. Since there are three packets from channel i in the epoch queues the answer is no, and another test is performed, at step 810, to check if ER(i)<PR(i). Since one packet from channel i has been placed in the epoch queue pointed by RP(i), ER(i)=PR(i)=1; the answer is no and another test is performed, at step 811, to check if RP(i)=TP+2. Since RP(i)=4 and TP+2=4, the answer is yes and step 812 is performed and the overflow queue sorter quits.

FIG. 13 depicts the state of the system after the operation of the overflow queue sorter. The transmitter resumes operation and checks, at the beginning of service epoch (i.e., beginning of an outgoing slot), at step 702, if the epoch queue pointed by the transmit pointer (i.e., EQ(TP)) is empty. Since epoch queue #0, 507, is not empty the answer is no and, at step 703, the transmitter serves the packet at the head of the line. Packet $i_3$ is transferred to the outgoing slot, EC(i) is decremented to 2 and another test is performed, at step 704, to check if the epoch queue pointed by the transmit pointer (i.e., EQ(TP)) is empty. The answer is no and, at step 703, the transmitter serves the packet at the head of the line. Packet $j_3$ is transferred to the outgoing slot, EC(j) is decremented to 0 and another test is performed, at step 704, to check if the epoch queue pointed by the transmit pointer (i.e., EQ(TP)) is empty. The answer is yes, and the transmitter increments the transmit pointer to TP=3, at step 705, and initiates the overflow queue sorter at step 706.

FIG. 14 depicts the state of the system at the end of the third cycle. A test is performed, at step 802, to check if the overflow queue 510, is empty. The answer is no and, at step 803, the channel number of the head-of-the-line packet in the overflow queue (i.e., i) is read. A test is performed, at step 804 to check if EC(i)=0. Since there are two packets from channel i in the epoch queues the answer is no, and another test is performed, at step 810, to check if ER(i)<PR(i). Since one packet from channel i has been placed in the epoch queue pointed by RP(i), ER(i)=PR(i)=1; the answer is no and another test is performed, at step 811, to check if RP(i)=TP+2. Since RP(i)=4 and TP+2=5, the answer is no and step 809 is performed. RP(i) is incremented to five, ER(i) is assigned the value of one, packet $i_6$ is placed in the epoch queue pointed by RP(i), which is epoch queue #2, 509. At step 813, the value of EC(i) is incremented to 3 and the value of OC(i) is decremented to 1. Another test is performed, at step 802, to check if the overflow queue 510 is empty. The answer is no and, at step 803, the channel number of the head-of-the-line packet in the overflow queue (i.e., i) is read. A test is performed, at step 804, to check if EC(i)=0. Since there are three packets from channel i in the epoch queues the answer is no, and another test is performed, at step 810, to check if ER(i)<PR(i). Since one packet from channel i has been placed in the epoch queue pointed by RP(i), ER(i)=PR(i)=1; the answer is no and another test is performed, at step 811, to check if RP(i)=TP+2. Since RP(i)=5, the answer is yes and step 812 is performed and the overflow queue sorter quits.

We next assume that a single packet from channel j, $j_5$, arrives to the receiver, at step 601, and finds the system in the state as depicted in FIG. 15. A test is performed, at step 602, to check if OC(j)=0. Since there is one packet from channel j in the overflow queue, the answer is no and step 603 is performed; packet $j_5$ is placed in the overflow queue 510 and the value of OC(j) is incremented to 2.

FIG. 16 depicts the state of the system after the operation of the overflow queue sorter 510 and a single packet arrival. The transmitter 512 resumes operation and checks, at the beginning of service epoch (i.e., beginning of an outgoing slot), at step 702, if the epoch queue pointed by the transmit pointer (i.e., EQ(TP)) is empty. Since epoch queue #0, 507 is not empty the answer is no and, at step 703, the transmitter 512 serves the packet at the head of the line. Packet $i_4$ is transferred to the outgoing slot, EC(i) is decremented to 2 and another test is performed, at step 704, to check if the epoch queue pointed by the transmit pointer (i.e., EQ(TP)) 506 is empty. The answer is yes, and the transmitter increments the transmit pointer to TP=4, at step 705, and initiates the overflow queue sorter, at step 506.

FIG. 17 depicts the state of the system at the end of the fourth cycle. A test is performed, at step 802, to check if the overflow queue 510 is empty. The answer is no and, at step 803, the channel number of the head-of-the-line packet in the overflow queue (i.e., i) is read. A test is performed, at step 804, to check if $EC(i)=0$. Since there are two packets from channel i in the epoch queues the answer is no, and another test is performed, at step 810, to check if $ER(i)<PR(i)$. Since one packet from channel i has been placed in the epoch queue pointed by $RP(i)$, $ER(i)=PR(i)=1$; the answer is no and another test is performed, at step 811, to check if $RP(i)=TP+2$. Since $RP(i)=5$ and $TP+2=6$, the answer is no and step 809 is performed. $RP(i)$ is incremented to five, $ER(i)$ is assigned the value of one, packet $i_7$ is placed in the epoch queue pointed by $RP(i)$, which is epoch queue #0, 507. At step 813, the value of $EC(i)$ is incremented to 3 and the value of $OC(i)$ is decremented to 0. Another test is performed, at step 802, to check if the overflow queue 510 is empty. The answer is no and, at step 803, the channel number of the head-of-the-line packet in the overflow queue (i.e., j) is read. A test is performed, at step 804 to check if $EC(j)=0$. Since there are no packets from channel j in the epoch queues the answer is yes, and another test is performed, at step 805, to check if $RP(j)=TP$. Since $RP(j)=2$ and $TP=4$, the answer is no and step 806 is performed; $RP(j)$ is set to 4, $ER(j)$ is set to 1 and the packet $j_4$ is placed in the epoch queue pointed by $RP(j)$. At step 813, $OC(j)$ is decremented to 1 and $EC(j)$ is incremented to 1. Another test is performed, at step 802, to check if the overflow queue 510 is empty. The answer is no and, at step 803, the channel number of the head-of-the-line packet in the overflow queue 510 (i.e., j) is read. A test is performed, at step 804, to check if $EC(j)=0$. Since there is one packet from channel j in the epoch queues the answer is no, and another test is performed, at step 810, to check if $ER(j)<PR(j)$. Since one packet from channel j has been placed in the epoch queue pointed by $RP(j)$, $ER(j)=PR(j)=1$; the answer is no and another test is performed, at step 811, to check if $RP(j)=TP+2$. Since $RP(j)=4$ and $TP+2=6$, the answer is no and step 809 is performed. $RP(j)$ is incremented to five, $ER(j)$ is assigned the value of one, packet $j_5$ is placed in the epoch queue pointed by $RP(j)$, which is epoch queue #2, 509. At step 813, the value of $EC(j)$ is incremented to 2 and the value of $OC(j)$ is decremented to 0. A test is performed, at step 802, to check if the overflow queue 510 is empty. The answer is yes and, at step 812, the overflow queue sorter quits.

FIG. 18 depicts the state of the system after the operation of the overflow queue sorter 510. The transmitter 512 resumes operation and checks, at the beginning of service epoch (i.e., beginning of an outgoing slot), at step 702, if the epoch queue pointed by the transmit pointer 506 (i.e., EQ(TP)) is empty. Since epoch queue #1, 508 is not empty the answer is no and, at step 703, the transmitter 512 serves the packet at the head of the line. Packet $i_5$ is transferred to the outgoing slot, $EC(i)$ is decremented to 2 and another test is performed, at step 704, to check if the epoch queue pointed by the transmit pointer 506 (i.e., EQ(TP)) is empty. The answer is no and, at step 703, the transmitter serves the packet at the head of the line. Packet $j_4$ is transferred to the outgoing slot, $EC(j)$ is decremented to 1 and another test is performed, at step 704, to check if the epoch queue pointed by the transmit pointer 506 (i.e., EQ(TP)) is empty. The answer is yes, and the transmitter increments the transmit pointer to $TP=5$ at step 705 and initiates the overflow queue sorter at step 706.

FIG. 19 depicts the state of the system at the end of the fifth cycle. A test is performed, at step 802, to check if the overflow queue 510 is empty. The answer is yes and, at step 812, the overflow queue sorter quits. The transmitter resumes operation and checks, at the beginning of service epoch (i.e., beginning of an outgoing slot), step 702, if the epoch queue pointed by the transmit pointer (i.e., EQ(TP)) is empty. Since epoch queue #2, 509 is not empty the answer is no and, at step 703, the transmitter 512 serves the packet at the head of the line. Packet $i_6$ is transferred to the outgoing slot, $EC(i)$ is decremented to 1 and another test is performed, at step 704, to check if the epoch queue pointed by the transmit pointer 506 (i.e., EQ(TP)) is empty. The answer is no and, at step 703, the transmitter 512 serves the packet at the head of the line. Packet $j_5$ is transferred to the outgoing slot, $EC(j)$ is decremented to 0 and another test is performed, at step 704, to check if the epoch queue pointed by the transmit pointer (i.e., EQ(TP)) is empty. The answer is yes, and the transmitter increments the transmit pointer 506 to $TP=6$ at step 705 and initiates the overflow queue sorter at step 706.

FIG. 20 depicts the state of the system at the end of the sixth cycle. A test is performed, at step 802, to check if the overflow queue 510 is empty. The answer is yes and, at step 812, the overflow queue sorter quits. The transmitter 512 resumes operation and checks, at the beginning of service epoch (i.e., beginning of an outgoing slot), at step 702, if the epoch queue pointed by the transmit pointer 506 (i.e., EQ(TP)) is empty. Since epoch queue #0, 507 is not empty the answer is no and, at step 703, the transmitter 512 serves the packet at the head of the line. Packet $i_7$ is transferred to the outgoing slot, $EC(i)$ is decremented to 0 and another test is performed, at step 704, to check if the epoch queue pointed by the transmit pointer 506 (i.e., EQ(TP)) is empty. The answer is yes, and the transmitter increments the transmit pointer to $TP=7$ at step 705 and initiates the overflow queue sorter at step 706.

Finally, the system becomes empty. The overflow queue sorter, at step 802, finds the overflow queue 510 empty and quits at step 812. The transmitter resumes operation, at step 702, and repeats this check until arrivals occur.

Thus, the order of departures after the packets joined the system was: $i_1$, $j_1$, $k_1$, $m_1$, $m_2$, (in the first epoch); $i_2$, $j_2$, $m_3$, $m_4$, (in the second epoch); $i_3$, $j_3$, (in the third epoch); $i_4$, (in the fourth epoch); $i_5$, $j_4$, (in the fifth epoch); $i_6$, $j_5$, (in the sixth epoch); $i_7$, (in the seventh epoch). The order of departures without the distortions caused by the overflow queue would be: $i_1$, $j_1$, $k_1$, $m_1$, $m_2$, (in the first epoch); $i_2$, $j_2$, $m_3$, $m_4$, (in the second epoch); $i_3$, $j_3$, (in the third epoch); $i_4$, $j_4$, (in the fourth epoch); $i_5$, $j_5$, (in the fifth epoch); $i_6$, (in the sixth epoch); $i_7$, (in the seventh epoch). Notice that packets $j_4$ and $j_5$ missed an epoch. Batches longer than the number of epoch queues could have some of their packets missing epoch. This effect may or may not be beneficial. The choice of the number of epoch queues, 507-509, as well as their sizes should be driven by engineering and performance guidelines.

The invention can be applied for serving packets at trunks in a slotted packet data network. It can also be applied in other environments that need effective scheduling processes such as in a multi-task/multi-user computer system. In the case of a slotted packet data network, it requires each packet to carry a channel identifier or some information that can be mapped into a channel identifier. In case of a computer system, it requires each process to have an identification number.

Thus, what has been described is merely illustrative of the application of the principles of the present invention. Other arrangements and methods can be implemented by those skilled in the art without departing from the spirit and scope of the present invention. It should be noted that the choice of the number of epoch queues as well as the sizes of the epoch queues and overflow queue should be selected based on engineering and performance requirements.

We claim:

1. Circuit apparatus for interfacing a received multichannel data signal to a communication facility, said data signal including a number of data batches, each data batch having been received over one of the multiple data channels and each data batch including one or more data packets, said apparatus comprising
   a sorter means for sorting information identifying one or more data packets of each data batch, into one or more of a plurality of N epoch queues such that for each data batch no information identifying more than a predetermined number P of data packets from a particular channel is inputted into each epoch queue and
   a memory server means for cyclically serving each epoch queue exhaustively to said facility.

2. The apparatus of claim 1 further comprising a memory unit including said N epoch queues.

3. The apparatus of claim 1 wherein
said sorter means sorts said information into an overflow queue after each epoch queue is saturated, such that all epoch queues are full or each epoch queue contains information identifying no more than P data packets from a particular channel, and wherein said sorter means subsequently sorts said information contents of said overflow queue sequentially into one or more epoch queues such that no information identifying more than P data packets from a particular data channel is inputted into one or more epoch queues.

4. The apparatus of claim 3 wherein said sorter means sorts said information of said overflow queue into at least a first epoch queue after said first epoch queue has been served by said server means and before another epoch queue has been served by said server means.

5. The apparatus of claim 3 including an overflow counter (OC) for counting for each channel the number of data packets stored in said overflow queue.

6. The apparatus of claim 3 wherein when said sorter means determines that a selected epoch queue being served is full, said sorter means stores information, identifying one or more data packets of a data batch, into another epoch queue or into the overflow queue, said information being that which otherwise would have been stored in the full epoch queue.

7. The apparatus of claim 6 wherein when said sorter means determines that a memory embodying said N epoch queues and said overflow queue, has reached a predetermined occupancy threshold, said sorter means discards each data packet associated with a new message of said received data signal.

8. The apparatus of claim 1 wherein said information identifying one or more data packets of each data batch is the one or more data packets themselves.

9. The apparatus of claim 1 wherein the information identifying one or more data packets of each data batch is a pointer identifying where the one or more data packets themselves are stored.

10. The apparatus of claim 1 wherein when said sorter means determines that a selected epoch queue being served is full, said sorter means stores information, identifying one or more data packets of said received data, into another epoch queue, said information being that which otherwise would have been stored in the full epoch queue.

11. The apparatus of claim 10 wherein when said sorter means determines that a memory, embodying said N cycle queues, has reached a predetermined occupancy threshold, said sorter means discards packets which are part of a new message of said received data signal.

12. The apparatus of claim 1 wherein said sorter means includes
   a first sorter means for sorting said received data signal and
   a second sorter means for sorting the contents of said overflow queue.

13. The apparatus of claim 12 wherein said second sorter means is given priority over said first sorter means to sort information into a epoch queue that has just been served by said server means.

14. The apparatus of claim 1 wherein once said sorter means has sorted information from a particular channel into said overflow queue, no subsequent information from said particular channel is stored in one of said N epoch queues until said overflow queue has been emptied of information from said particular channel.

15. The apparatus of claim 1 wherein the number P can be independently specified for each of said channels.

16. The apparatus of claim 1 wherein P is equal to one.

17. The apparatus of claim 1 including a epoch counter (EC) for counting for each channel the number of data packets stored in all N epoch queues.

18. The apparatus of claim 1 including a receive pointer (RP) for specifying for each channel the epoch queue in which information should be stored.

19. The apparatus of claim 18 including an epoch register (ER) for counting the number of data packets of each channel the number of packets stored in the epoch queue that is presently being pointed to by the receive pointer (RP).

20. The apparatus of claim 1 including a transmit pointer (TP) for indicating the epoch queue that is currently being served by said memory server means.

21. The apparatus of claim 1 including a receive pointer (RP) for specifying for each channel the epoch queue in which information should be stored, said receiver pointer being incremented each time said sorter means sorts to another epoch queue;
   a transmit pointer (TP) for indicating the epoch queue that is currently being served by said memory server means, said transmit pointer being incremented each time said memory server means serves another epoch queue; and
   wherein said receive pointer and said transmit pointer each reset when they reach the count M, where M is an integer multiple of N.

22. The apparatus of claim 1 including a priority register (PR) for specifying for each channel the number P of data packets that should be sorted into each epoch queue, wherein the higher the number P for a channel the higher the data transmission rate for that channel relative to other channels.

23. A method of interfacing a received multichannel data signal to a communication facility, said data signal including a number of data batches, each data batch having been received over one of the multiple data channels and each data batch including one or more data packets, said method comprising the steps of sorting information identifying one or more data packets of each data batch into one or more of a plurality of epoch queues such that for each data batch no information identifying more than a predetermined number of P data packets from a particular channel is inputted into each epoch queue, and cyclically serving each epoch queue exhaustively to said facility.

24. The method of claim 23 wherein said sorting step further sorts said information into an overflow queue after each epoch queue is saturated, such that all epoch queues are full or each epoch queue contains information identifying no more than P data packets from a particular channel, and wherein said sorting step subsequently sorts said information contents of said overflow queue sequentially, such that no information identifying more than P data packets from a particular data channel is inputted into one or more epoch queues.

25. The method of claim 24 wherein said sorting step sorts said information of said overflow queue into at least a first epoch queue after said first epoch queue has been served during said serving step and before another epoch queue has been served during said serving step.

26. The method of claim 24 wherein said sorting step includes the step of determining when a selected epoch queue being served is full, and storing information identifying one or more data packets of a data batch into another epoch queue or into the overflow queue, said information being that which otherwise would have been stored in the full epoch queue.

27. The method of claim 26 wherein said determining step determines when said epoch queues and said overflow queue have reached a predetermined occupancy threshold, and wherein in response to said determination said apparatus discards each data packet associated with a new message of said received data signal.

28. The method of claim 23 wherein said sorting step includes the steps of determining when a selected epoch queue being served is full, and storing information, identifying one or more data packets of said received data, into another epoch queue, said information being that which otherwise would have been stored in the full epoch queue.

29. The method of claim 28 wherein said determining step determines when said N epoch queue has reached a predetermined occupancy threshold, it discards packets which are part of a new message of said received data signal.

* * * * *